(12) United States Patent
Syrjanen et al.

(10) Patent No.: US 12,403,715 B2
(45) Date of Patent: Sep. 2, 2025

(54) SECURITY DEVICE FOR SECURING AN ARTICLE SUCH AS A PASSPORT

(71) Applicant: THALES DIS FRANCE SAS, Meudon (FR)

(72) Inventors: Taru Syrjanen, Vantaa (FI); Kristian Lappalainen, Espoo (FI); Kai Makinen, Vantaa (FI); Daniel Wadell, Blaine, MN (US)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/702,352

(22) PCT Filed: Oct. 21, 2022

(86) PCT No.: PCT/EP2022/079370
§ 371 (c)(1),
(2) Date: Apr. 18, 2024

(87) PCT Pub. No.: WO2023/067136
PCT Pub. Date: Apr. 27, 2023

(65) Prior Publication Data
US 2024/0399780 A1    Dec. 5, 2024

(30) Foreign Application Priority Data
Oct. 22, 2021    (EP) .................................. 21306472

(51) Int. Cl.
*B42D 25/24* (2014.01)
*B42D 25/373* (2014.01)
*G06K 19/07* (2006.01)

(52) U.S. Cl.
CPC ............ *B42D 25/24* (2014.10); *B42D 25/373* (2014.10); *G06K 19/0724* (2013.01)

(58) Field of Classification Search
CPC .... B42D 25/24; B42D 25/373; B42D 25/305; G06K 19/0724; G06K 19/07
(Continued)

(56) References Cited

U.S. PATENT DOCUMENTS

| 8,344,958 B2 | 1/2013 | Artigue et al. |
| 2010/0328922 A1* | 12/2010 | Peters .................... B42D 25/24 361/816 |

FOREIGN PATENT DOCUMENTS

| EP | 2258562 A2 | 12/2010 |
| KR | 20100066655 A | 6/2010 |

OTHER PUBLICATIONS

International Search Report (PCT/ISA/210) and Written Opinion (PCT/ISA/237) mailed on Jan. 5, 2023, by the European Patent Office as the International Searching Authority for current International Application No. PCT/EP2022/079370—[12 pages].

* cited by examiner

*Primary Examiner* — Justin V Lewis

(57) ABSTRACT

Provided is a security device for securing a substrate comprises at least one connection device, and at least one output device. The security device is configured to be connected to the substrate via the connection device. The output device is configured to emit at least one output signal. The output signal is outputted to an outside of the security device when the connection device and the output device are coupled to one another. A change in the coupling between the connection device and the output device results in a change in the output signal or in an absence of the output signal, and wherein the change in the output signal or the absence of the output signal is indicative of a manipulation of the security device and/or of the substrate. Other embodiments disclosed.

16 Claims, 4 Drawing Sheets

(58) Field of Classification Search
USPC ..... 283/63.1, 64, 67, 70, 72, 74, 75, 83, 94, 283/98, 101, 106, 107, 901
See application file for complete search history.

SECURITY DEVICE FOR SECURING AN ARTICLE SUCH AS A PASSPORT

TECHNICAL FIELD

The present invention relates to a security device for securing a substrate according to claim 1, to a substrate comprising such a security device according to claim 13, and to a method of producing a security device according to claim 15.

BACKGROUND

It is a general desire to secure multipage articles such as security documents, e.g. passports, or any other value document against manipulation. The main components of these articles such as passports typically are covers, paper pages, a datapage, a spine tape and a sewing thread. When a forger wants to manipulate the article such as to remove or change data being provided in the datapage, for instance, he usually opens the stitching in the booklet, attacks the relevant pages, and re-uses or replaces the sewing threads.

Various security devices for securing these articles against a manipulation are known. For instance, the addition of UV glue onto the stitching, or a melting of the thread are common ways known in the state of the art.

A connection of the article components by means of these stitchings renders an opening of the stitching more difficult. However, a forger having adequate skills is still able to open the stitching and to replace the thread by a look-a-like thread, wherein the manipulation of the article may go unnoticed.

SUMMARY

It is an object of the present invention to provide a security device for securing a substrate against manipulation with high security.

This object is achieved with the security device according to claim 1. In particular, a security device for securing a substrate such as a security document, a value document or the like, against manipulation is provided. The security device comprises at least one connection device. The security device is configured to be connected to the substrate via the connection device. The security device furthermore comprises at least one output device. The output device is configured to emit at least one output signal. The connection device and the output device are configured to be coupled to one another. The security device is configured such, that the output signal is outputted to an outside of the security device when the connection device and the output device are coupled to one another. A change in the coupling between the connection device and the output device results in a change in the output signal or in an absence of the output signal. The change in the output signal or the absence of the output signal is indicative of a manipulation of the security device and/or of the substrate.

In particular, an unchanged output signal being outputted to the outside of the security device is indicative of an absence of a manipulation of the substrate or, in other words, is indicative of an authentic substrate. The security device is preferably furthermore configured such that the unchanged output signal is outputted to the outside of the security device in a state where the security device, in particular the connection device, is connected to the substrate. Moreover, the security device is preferably configured such that the output signal is not outputted to the outside of the security device or corresponds to a changed output signal in a state where the security device, in particular the connection device, is not connected to the substrate or has been removed and thereafter re-connected to the substrate.

Hence, the present invention is based on an integrity being formed between the connection device and the output device in the absence of a manipulation that can be checked by checking the output signal.

The output device and the connection device are preferably configured such that the output signal is outputted from the output device via the connection device to the outside. In other words, the output signal is preferably transmitted to the outside via the connection device.

The connection device is preferably bendable and/or stretchable and/or elastically deformable or plastically deformable. Additionally or alternatively, the connection device is preferably stitchable or sewable or weavable. The connection device is particularly preferably configured as a thread or yarn.

The connection device preferably is electrically conductive. It is furthermore preferred that the connection device comprises or consists of at least one electrically conductive material, preferably at least one metal and/or at least one metal-containing compound and/or at least one conductive polymer. The connection device particularly preferably comprises or consists of at least one electrically conductive composite material.

That is to say, the connection device particularly preferably corresponds to an electrically conductive thread or yarn that is connectable to the substrate by means of stitching or sewing or weaving as it is known for "classical" threads or yarns. Furthermore, and as will be explained in greater detail below, the connection device preferably serves the purpose of being an antenna via which the output signal from the output device can be outputted to the outside. That is, the connection device fulfils two purposes: on the one side, it serves as a connection means for connecting the output device to the substrate. On the other side, it serves as a transmittal means for transmitting the output signal from the output device to the substrate.

The output device preferably is an electromagnetic device or an electronic device or a magnetic device. The output signal preferably is an electromagnetic field signal or an electric field signal or a magnetic field signal.

The security device preferably further comprises a transponder, preferably an RFID transponder. The transponder preferably is a passive transponder, in particular a passive RFID transponder. However, it is likewise conceivable that the transponder is an active transponder, in particular an active RFID transponder. The transponder preferably comprises the output device and the connection device. The output device is preferably configured as a microchip. The connection device is preferably configured as an antenna.

That is to say, the security device preferably comprises at least one transponder, in particular an RFID transponder, wherein said transponder or RFID transponder comprises a microchip and an antenna for receiving an input signal and transmitting an output signal. The output device preferably constitutes the microchip and the connection device preferably constitutes the antenna of said transponder.

As will be explained in greater detail below, the output signal is preferably detectable by a detection device, wherein said detection device particularly preferably is a RFID reader. Hence, the security device can be configured as a passive/active transponder, in particular a passive/active RFID transponder, wherein the transponder such as the RFID transponder is powered by energy from the reader such as the RFID reader. Consequently, it is preferred that the transponder is configured to be powered from the detection device, for instance by means of an input signal being emitted from the detection device.

The output device is preferably configured to emit the output signal at a frequency in the range of 0.3 GHZ to 3 GHZ. That is, the output device is preferably configured to emit the output signal in the Ultra High Frequency (UHF) range. Hence, the output signal preferably comprises a frequency in the range of 0.3 GHz to 3 GHZ and/or the output signal preferably is in the UHF range. To this end it is particularly preferred that the output device is configured to emit the output signal at a frequency in the range of 860 MHz to 960 MHZ, although other frequencies are likewise conceivable. The output device is particularly preferred to emit the output signal in accordance with standards, for instance in accordance with the ISO/IEC 18000-63, the FCC part 15, the FCC 15.247, the ETSI EN 302 208, the GS1 EPC global GS1 EPC Tag Data Standard, etc., standards. It should be noted that the output device and/or the output signal can be in compliance with further current and/or future standards such as 5G or 6G as well.

The output signal is preferably detectable by a detection device and/or is machine-readable. The detection device is preferably arranged outside of the security device, in particular also outside of the substrate in the event that the substrate is connected to the security device. That is, the detection device preferably corresponds to a remote device being arranged remotely from the security device and furthermore also from the substrate. As mentioned earlier, the detection device being configured to detect the output signal preferably is a reader such as an RFID reader. Hence, the security device together with the detection device preferably forms a RFID-system comprising the output device and the connection device as RFID-transponder and the detection device as RFID-reader.

The output device is preferably configured to emit the output signal upon receipt of an input signal. The input signal preferably is emitted by the detection device and/or being transmitted via the connection device.

However, it is likewise preferred that the output device is configured to backscatter modulate an input signal to a detection device. The input signal preferably is emitted by the detection device and/or is collected by the connection device.

In the former case it is preferred that the security device, in particular the output device, is configured as an active transponder, whereas in the latter case it is preferred that the security device, in particular the output device, is configured as a passive transponder.

The output device preferably comprises a non-volatile memory with data, and wherein the output device is configured to transmit the data to the outside via the output signal. The output device being configured to transmit the data to the outside via the output signal is understood as the output device being configured to transfer the data using the output signal. The non-volatile memory of the output device is preferably a non-volatile memory of the microchip mentioned above. The data comprised in the non-volatile memory or detected by the detection device is preferably comparable with reference data. Said reference data is preferably provided on and/or in the substrate and/or on and/or in the security device. In fact, said reference data is preferably provided in a further non-volatile memory being arranged in the substrate or in the security device.

A comparison of the data with the reference data preferably allows a further authentication of the substrate. For instance, the substrate could be a security document such as a passport, wherein the data can correspond to the number of the passport, and wherein the further data could be the number of the passport being laser-engraved in the passport. Hence, by comparing the passport number being detected by the RFID-system with the laser-engraved passport number an authenticity of the passport can be verified.

The output device preferably has a capacitance and the connection device preferably has an inductance, and wherein the capacitance of the output device and the inductance of the connection device are configured to form a resonance circuit being associated with a frequency, preferably a frequency in the Ultra High Frequency (UHF) range. The security device is preferably configured such that the manipulation of the security device and/or of the substrate tunes the impedance of the output device out of the frequency, whereby the output signal is preferably changed or absent.

That is, the connection device, in particular the connection device being the antenna, and the output device, preferably the microchip, preferably form a resonance circuit such as a UHF-resonance circuit. When the security device or the substrate is manipulated, a detection of the output signal does no longer succeed because the tuning of the antenna and the microchip is out of the operational frequency.

Hence, since the security device preferably comprises an RFID transponder with the output device being a microchip and the connection device being an antenna, the change in the output signal preferably is an RF change. The RF change preferably is a shifted frequency formed between the connection device and the output device, and/or a reduced transmit power being associated with the connection device and/or the output device, and/or a reduced receiver sensitivity being associated with the connection device and/or the output device, and/or a reduced antenna efficiency being associated with the connection device and/or the output device, Additionally or alternatively, the change in the output signal preferably is a data change. Said data change preferably is a data mismatch being associated with the data being stored in the non-volatile memory of the output device and further data being stored in a further non-volatile memory of the security device and/or of the substrate. Said further non-volatile memory of the security device and/or of the substrate could be provided in a further microchip, hence in a further microchip being arranged in the security device and/or the substrate. To this end it is furthermore preferred that the output device, i.e. here the microchip, and said further microchip are configured to communicate with one another, and that said communication can furthermore be outputted to the outside via the connection device, i.e. here the antenna. As such, a data mismatch resulting from a comparison between the data of the microchip and the further data of the further microchip could be outputted to the outside. In this regard it is preferred that the output device in the form of the microchip comprises a non-volatile memory and/or that the further microchip comprises a further non-volatile memory being an EPC memory and/or TID memory and/or USER memory and/or RESERVED memory as it is known in the art.

The security device is preferably furthermore configured such that a manipulation is detectable by a visual change. Conceivable visual changes could be a visibly different shape and/or location of the connection device and/or of the output device. Said visual change could be observable by naked eye and/or with an inspection aid such as an X-ray inspection, etc.

The connection device preferably has a length that is associated with a frequency of the output signal. The length of the connection device preferably is equal to or a multiple of or a fraction of a wavelength being associated with the frequency of the output signal.

That is to say, the length of the connection device, e.g. of the antenna, is related to the wavelength of the output signal, e.g. to the wavelength of the radio waves used. In other words, the length of the connection device, for instance of the antenna, is preferably tuned to a target frequency of the output device, for instance to the UHF-area. Since the frequency of the output signal particularly preferably is in the range of 860 MHz to 960 MHZ, the length of the connection device preferably is in the range of about 34 cm to 31 cm or multiples or fractions thereof. To this end it is particularly preferred that the length of the connection device is a fraction of the wavelength, for instance half thereof. However, if other frequencies of the output signal are preferred, other lengths of the connection device could likewise be provided. In fact, the length of the connection device can take any value between $2\cdot\lambda$ to $\lambda/17$.

The security device is preferably configured to emit the output signal within a predetermined distance and/or within a distance in the range of 10 millimeter to 10 meter. The predetermined distance and/or the distance preferably is in the range of 40 millimeter to 100 millimeter. Hence, also in this regard it should be understood that other distances along which the output signal can be emitted are likewise conceivable. Said so-called target read range is application specific. For instance, a target read range in the UHF read range could be less than or greater than or about 2 meter to 6 meter. However, another target read range could be between 40 millimeter to 100 millimeter or less or more.

The coupling between the connection device and the output device can be established via a wired connection or a wireless connection. The security device is preferably further configured such that an impedance of the output device and an impedance of the connection device generate an impedance matching circuit, and wherein the coupling between the connection device and the output device is established via the impedance matching circuit.

It should be noted that the security device can comprise more than one connection device, for example two or more connection devices, and wherein said two or more connection devices are in wireless connection and/or in wired connection with the output device.

A wired connection could be provided by means of a direct or immediate physical contact being established between the connection device and the output device. For instance, the connection device could comprise a free end that is connected to the output device. It is however likewise conceivable that a wired connection is provided by means of an indirect physical contact being established between the connection device and the output device, for instance by providing at least one connection element via which the connection device and the output device are in connection with one another. Said connection element preferably corresponds to an electrically conductive element such as a wire.

A wireless connection could be established by means of inductive coupling.

In the following, conceivable designs of the connection between the connection device and the output device are presented in greater detail for exemplary purposes.

For instance, the connection device could comprise a free end that is attached to the output device. In other words, the connection device could extend from the output device. When the connection device corresponds to an antenna as mentioned above, the connection device of this design could be seen as a monopole antenna.

Another conceivable example comprises a wired connection between the connection device and the output device via an additional element, in fact by a connection element which preferably is an connection element such as a wire, and wherein one end of the connection element is connected to the output device and another end of the connection element is connected to the connection device. A preferred connection between the connection element and the connection device is established in a middle region of the connection device. In other words, the connection element divides the connection device into two sections. In the event that the connection device corresponds to an antenna as mentioned earlier, the connection device of this design could be seen as a dipole antenna.

In another conceivable example, two connection devices are provided, wherein each connection device is connected to the output device. To this end it is particularly preferred that the connection devices are arranged on opposite sides of the output device. It is furthermore preferred that the connection devices extend from the output device along opposing directions. A connection of the connection devices to the output device preferably takes place by attaching a free end of the connection devices to the output device. In the event that the connection device corresponds to an antenna as mentioned earlier, the connection device of this design could be seen as a dipole antenna.

In another conceivable example, the connection device is arranged separately from the output device, and wherein a connection element such as a conductive wire is attached to the output device only. An impedance of said connection element and an impedance of the output device preferably form an impedance matching circuit, and wherein a connection between the connection device and the output device is established via the impedance matching circuit and an impedance of the connection device. When the connection device corresponds to an antenna as mentioned earlier, said connection device can be configured as a monopole antenna or a dipole antenna as well, depending on the arrangement of the output device with respect to the connection device. For instance, by arranging the output device in a region of a free end of the connection device a monopole antenna can be generated, whereas an arrangement of the output device in a middle region of the connection device generates a dipole antenna.

In any case it is preferred that a total length of the connection device or of the connection devices is associated with a frequency of the connection device, and wherein said total length preferably is equal to or a multiple of or a fraction of a wavelength being associated with the frequency of the output signal. For instance, if two connection devices are provided, the total length would correspond to the sum of the length of the first connection device and the length of the second connection device.

The security device preferably comprises a carrier device. The output device and/or the connection device is preferably arranged at least partially within the carrier device. The carrier device can comprise or consist of one or more textiles and/or one or more fabrics and/or one or more paper-based compounds and/or one or more cardboard-based compounds and/or one or more plastics and/or one or more adhesive compounds.

Preferred carrier devices are cardboard devices or paper devices or textile-based devices or polymer-based devices such as the cover or a page of a passport. Further preferred carrier devices are fabrics or textiles such as hinges used to attach a datapage to the passport booklet. A further preferred carrier device is an adhesive device such as a spine tape or bookbinding tape.

To this end it is particularly preferred that the output device is embedded within the carrier device. In a final state the connection device is preferably arranged at least partially in the carrier device and at least partially in the substrate. In fact, and as mentioned earlier, the connection device particularly preferably corresponds to an electrically conductive thread or yarn. To this end it is preferred that said electrically conductive thread or yarn is used to connect the carrier body to the substrate, for instance by sewing or stitching the carrier device such as the hinge or the cover or the datapage to the substrate such as a passport.

In fact, the output device in the form of the microchip can be attached by means as commonly known in the state of the art into a datapage, onto the spine tape, inbetween the inner cover page and the cover of a passport, etc. The connection device in the form of the antenna and provided as conductive thread or yarn can be attached by means of sewing, stitching, weaving, gluing, welding, etc. into the cover or inner cover, security papers, datapage, spine tape, hinge, etc. Depending on a location of the output device and the connection device, they are preferably in direct wire contact or in a wireless such as an inductive contact.

In a further aspect, a substrate comprising at least one security device as described above is provided. The substrate preferably is a security document, a value document or the like.

Any explanations made herein with regard to the security device per se likewise apply to the substrate comprising the security device and vice versa.

Hence, for instance, the security device preferably comprises a carrier device such as a fabric or textile, within which the output device is embedded and which is connected to the substrate by the connection device. In fact, the connection device preferably corresponds to an electrically conductive thread or yarn that is sewing or stitching the carrier device to other parts of the substrate, whereby the security device is connected to the substrate. That is, the security device is preferably connected to the substrate via the connection device, wherein the connection device is stitched or sewed.

The security device according to the invention can be combined with further elements as they are known in the art. For instance, passport booklets as they are known in the art are typically sewn by means of a top thread and an under thread. The top thread may be characteristic for the country and the under thread may be plain cotton, polycotton, polyester, polyamide etc. without colours or extra features. An example of a substrate according to the invention comprises the security device, wherein the under thread of the state of the art is replaced by the connection device in the form of the electrically conductive yarn or thread. It should be noted that the upper thread could likewise be provided by means of the connection device according to the invention.

In a further aspect, a method of producing a security device for securing a substrate such as a security document, a value document or the like, against a manipulation, is provided.

The security device preferably is the security device as described above. The method comprises the steps of i) providing at least one connection device, wherein the security device is configured to be connected to the substrate via the connection device, and ii) providing at least one output device. The output device is configured to emit at least one output signal. The connection device and the output device are configured to be coupled to one another. The security device is configured such, that the output signal is outputted to an outside of the security device when the connection device and the output device are coupled to one another. A change in the coupling between the connection device and the output device results in a change in the output signal or in an absence of the output signal. The change in the output signal or the absence of the output signal is indicative of a manipulation of the security device and/or of the substrate.

Any explanations made herein with regard to the security device or the substrate likewise apply to the method of producing a security device for securing a substrate and vice versa.

As mentioned above, the substrate preferably corresponds to a security document, a value document or the like, which preferably comprises one or more security papers, a datapage, cover pages, a spine tape, etc. Said components preferably correspond to components known in the state of the art. It is furthermore preferred that said components are connected to one another according to methods as they are known in the art as well. It is furthermore preferred that the spine tape is attached onto the inner cover and that the datapage is added inbetween the security papers. Moreover, the inner cover page, security papers and datapage are being sewn together, wherein the connection device is used for sewing. Thereafter, it is preferred that the cover is glued onto the inner cover paper and that lastly the booklet is punched.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DETAILED DESCRIPTION

Figure 1:
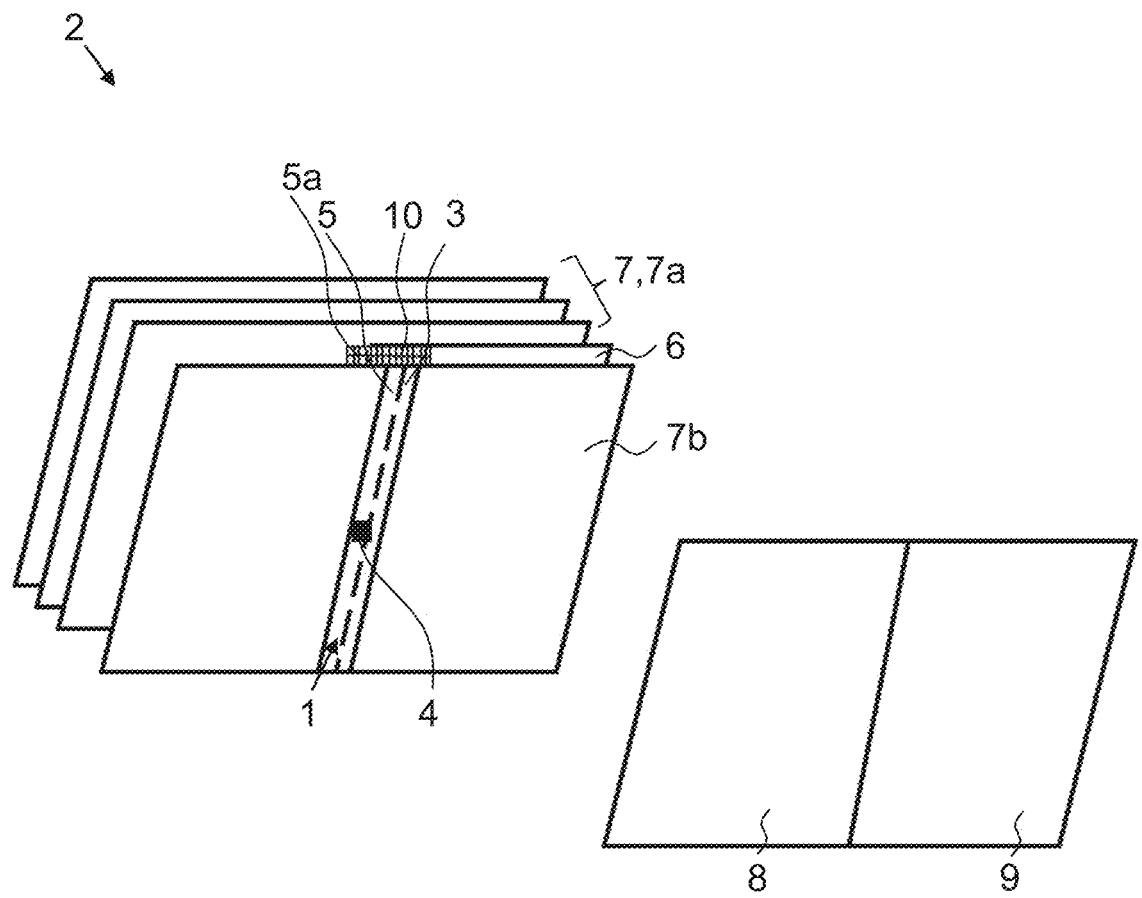
FIG. 1 shows an exploded view of a substrate in the form of a passport comprising security papers and a hinge and furthermore comprising a security device according to the invention.
Figure 2:
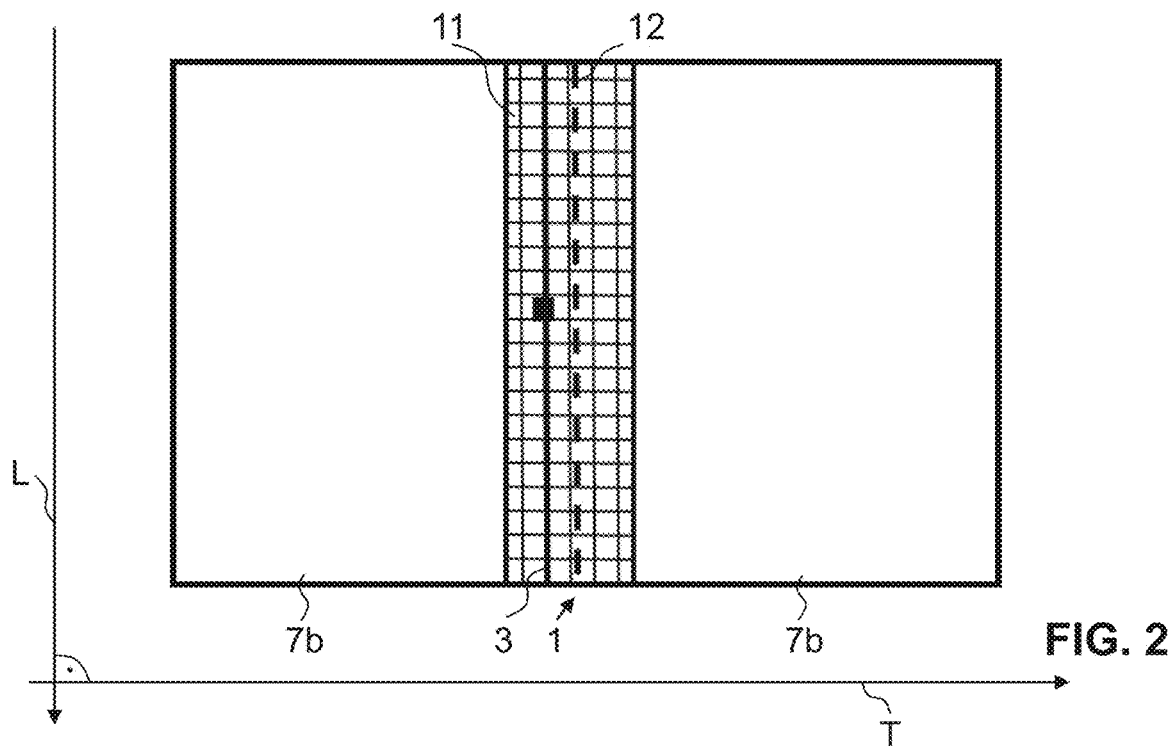
FIG. 2 shows a top view on another substrate in the form of security papers and comprising the security device according to the invention.
Figure 3:
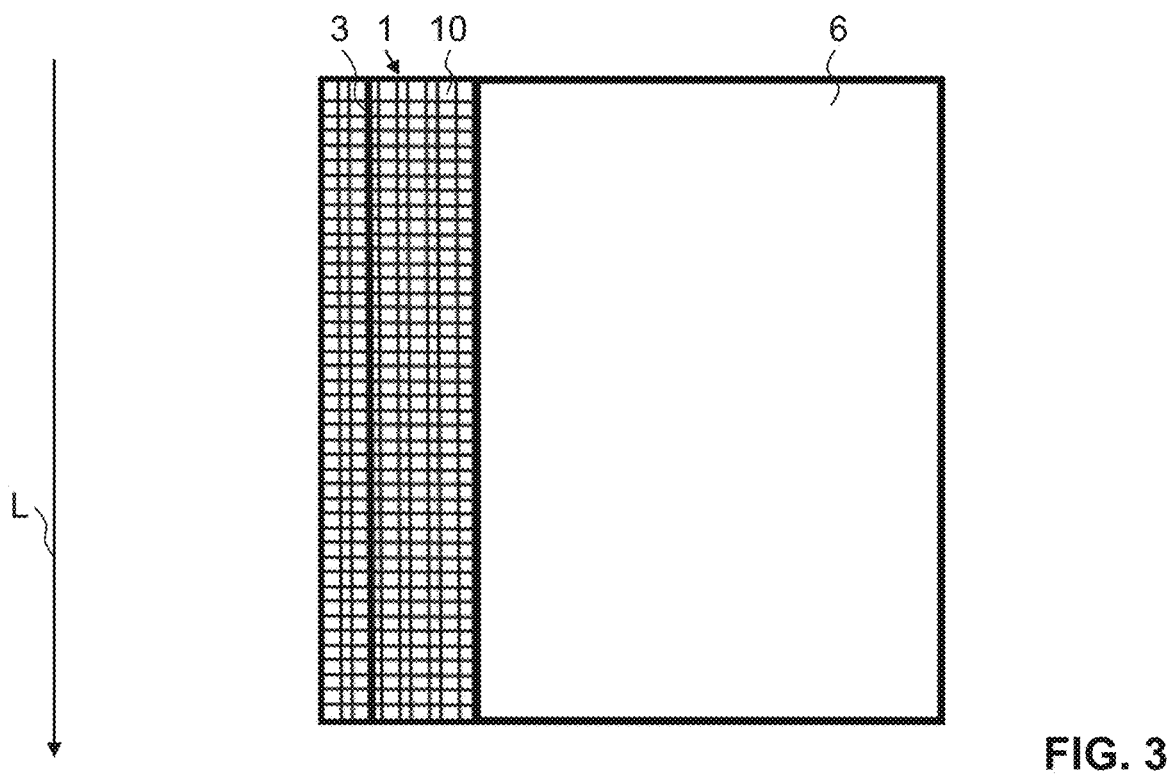
FIG. 3 shows a top on another substrate in the form of a datapage and comprising the security device according to the invention.

Aspects of the security device 1 for securing a substrate 2 such as a security document, a value document or the like against manipulation will be explained in greater detail with reference to the figures.

The security device 1 comprises a connection device 3, an output device 4 and at least one carrier device 5. The connection device 3 is a bendable and stretchable thread or yarn made of an electrically conductive material. The output device 4 is configured to be coupled to the connection device 3 and is furthermore configured to emit at least one output signal. The security device 1 is configured such, that the output signal is outputted to an outside of the security device 1 when the connection device 3 and the output device 4 are coupled to one another. In fact, the output device 4 and the connection device 3 are configured such that the output signal is outputted from the output device 4 via the connection device 3 to the outside. A change in the coupling between the connection device 3 and the output device 4 results in a change in the output signal or in an absence of the output signal, and wherein the change in the output signal or the absence of the output signal is indicative of a manipulation of the security device 1 and/or of the substrate 2.

In the depicted examples the output device 4 corresponds to a microchip. The security device 1, in particular the output device 4, is configured to be connected to the substrate 2 via the connection device 3.

In the examples depicted in FIGS. 1 to 4b, the substrate 2 corresponds to a passport comprising a booklet that is constituted by a datapage 6 and security papers 7, 7a, 7b, . . . being arranged within a top cover 8 and a bottom cover 9. The datapage 6, security papers 7, 7a, 7b, . . . and the covers 8, 9 are in connection with one another as well as with the security device 1, in particular with the connection device 3, via a hinge 10 extending along a longitudinal direction L of the substrate 2. As best seen in FIGS. 1, 2, 4a and 4b, the datapage 6 and the security papers 7, 7a, 7b, . . . are sewn or stitched together by the connection device 3. That is, the connection device 3 extends along the hinge 10 as well as along the longitudinal direction L as well as at least partly along a transverse direction T running perpendicularly to the longitudinal direction L. The output device 4 is here embedded within the cover 8 of the passport 2 and is furthermore arranged in the region of a spine tape 11 as it is known in the art. The carrier devices 5, 5a, . . . mentioned above are provided here by the cover 8, the hinge 10 and the spine tape 11. Hence, by sewing or stitching these different components of the passport 2 together, the output device 4 is connected to the passport 2 via the connection device 3.

Thus, if a forger replaces one or more components of the passport such as the datapage 6 or security papers 7, 7a, 7b, . . . , he will have to manipulate the connection device 3. Typically, forgers remove the yarns or threads when replacing the security papers or datapages with forged security papers or datapages while re-using the removed yarns or threads or replacing them. In doing so, the coupling between the connection device 3 and the output device 4 would be changed or even interrupted, whereupon a changed output signal or no output signal at all would be emitted. Said changed output signal or an omitted output signal is indicative of the manipulation of the substrate 2.

Figure 4A:
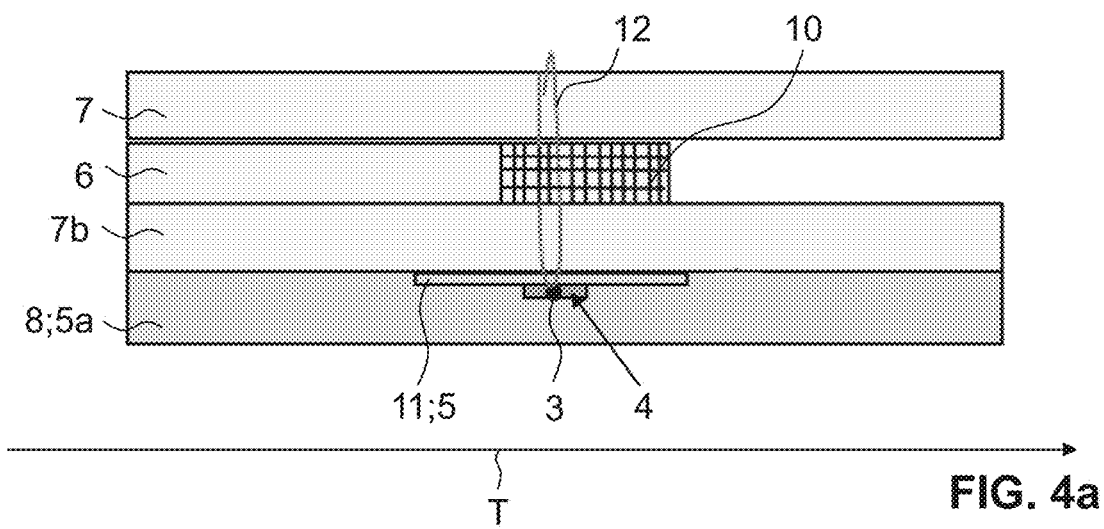
FIG. 4a shows a sectional view through the substrate according to FIG. 1 along a transverse direction of the substrate.
Figure 4B:
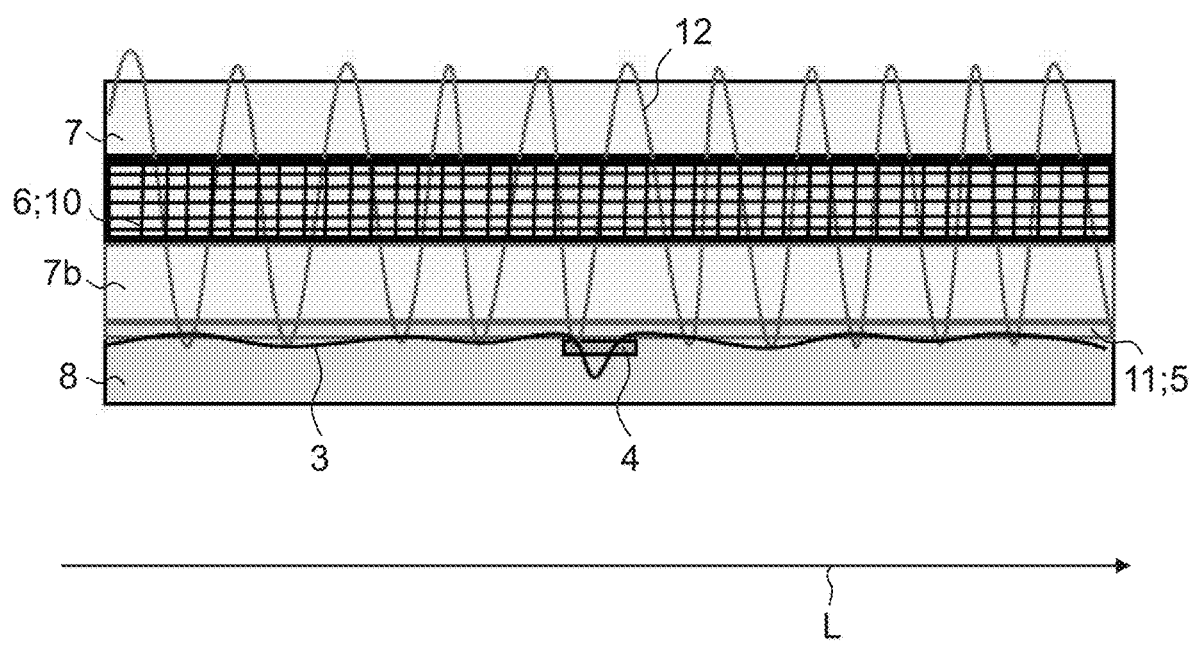
FIG. 4b shows a sectional view through the substrate according to FIG. 1 along a longitudinal direction of the substrate.

As follows from FIGS. 4a and 4b, the substrate 2 can comprise further features as they are known in the art. For instance, in addition to the connection device 3 in the form of the electrically conductive yarn or thread a basic thread 12 can be present as well. Furthermore, although not depicted, security elements such as security prints or embossings etc., could be present on and/or in the substrate 2 such as on and/or in the datapage or visapage.

The security device 1 furthermore comprises a transponder, here an RFID transponder, wherein the transponder comprises the output device 4 and the connection device 3. That is, the output device 4 in the form of the microchip and the connection device 3 in the form of the electrically conductive thread or yarn provide a transponder. To this end the connection device 3 in the form of the electrically conductive thread or yarn is configured as an antenna, by means of which the output signal can be transmitted from the microchip 4 to the outside of the security device 1.

The change in the output signal preferably is an RF change. For instance, a manipulation of the security device 1 and/or of the substrate 2 can manifest itself in a shifted frequency formed between the connection device 3 and the output device 4 (see further below). Likewise, a reduced transmit power being associated with the connection device 3 and/or the output device 4, and/or a reduced receiver sensitivity being associated with the connection device 3 and/or the output device 4 could be observed. A reduced antenna efficiency being associated with the connection device 3 and/or the output device 4 could be detected as well.

Furthermore, the output device 4 in the form of the microchip can comprise a non-volatile memory with data, and wherein the output device 4 is configured to transmit the data to the outside via the output signal and via the connection device 3. Hence, the change in the output signal can likewise correspond to a data change, for instance in the event that no data is transmitted or false data is transmitted or a data mismatch is transmitted. In fact, the security device 1 and/or the substrate 2 can comprise at least one further microchip comprising a further non-volatile memory such as an EPC memory, TID memory, USER memory or RESERVED memory.

In this case, the at least two microchips could operate and be accessed separately, and wherein a data content in the two microchips could be different and/or wherein the microchip of the output device could not be read at all.

A manipulation of the security device could result in a memory or format that does not match the expected issued format, which would be indicative of a manipulation. The absence of a microchip or if a microchip could not be read could be indicative of a manipulation as well.

As will be explained with respect to FIGS. 5 to 8, various designs of the connection device 3 as well as interplays between the connection device 3 and the output device 4 are conceivable. For instance, the coupling between the connection device 3 and the output device 4 can be established via a wired connection or a wireless connection.

Furthermore, only one connection device 3 or two or more connection devices 3, 3a, . . . could be present. In addition, the connection device(s) 3 can have a straight shape extending along a single direction or can be varied in shape and/or extending along two or more directions.

Figure 5:
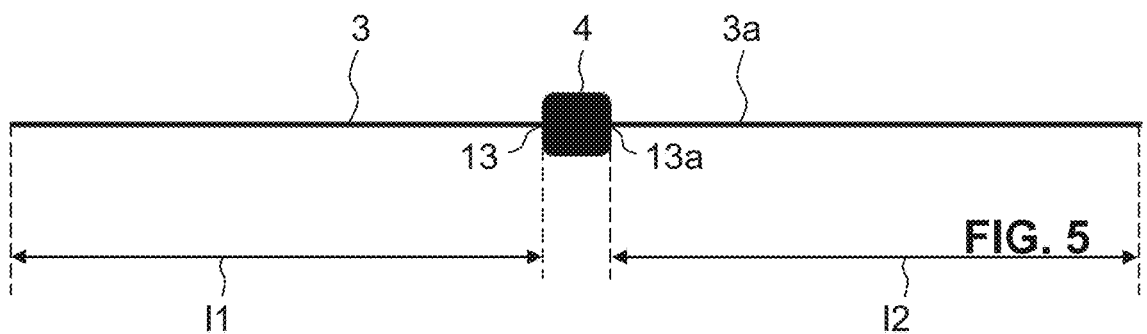
FIG. 5 shows a schematic representation of the security device comprising a connection device and an output device according to a first embodiment.

FIG. 5 depicts an example where two connection devices 3, 3a are provided, and wherein each connection device 3 is connected to the output device 4. That is, FIG. 5 depicts an example of a wired connection being established between the output device 4 and the connection devices 3, 3a. The connection devices 3, 3a are arranged here on opposite sides of the output device 4 and extend from the output device 4 along opposing directions. A connection of the connection devices 3 to the output device 4 takes place by attaching a free end 13, 13a of the connection devices 3, 3a to the output device 4. As mentioned earlier, the connection device 3 in the form of the electrically conductive yarn or thread serves the purpose of an antenna, wherein the depicted connection devices 3, 3a can be seen as a dipole antenna. As just mentioned, other shapes and directions are however likewise conceivable. For instance, the dipole antenna formed by the two connection devices 3, 3a in FIG. 5 could likewise be represented by connection devices 3, 3a being arranged angled with respect to one another, such as representing the letter "L", or they could be of a wavy shape, etc.

Figure 6:
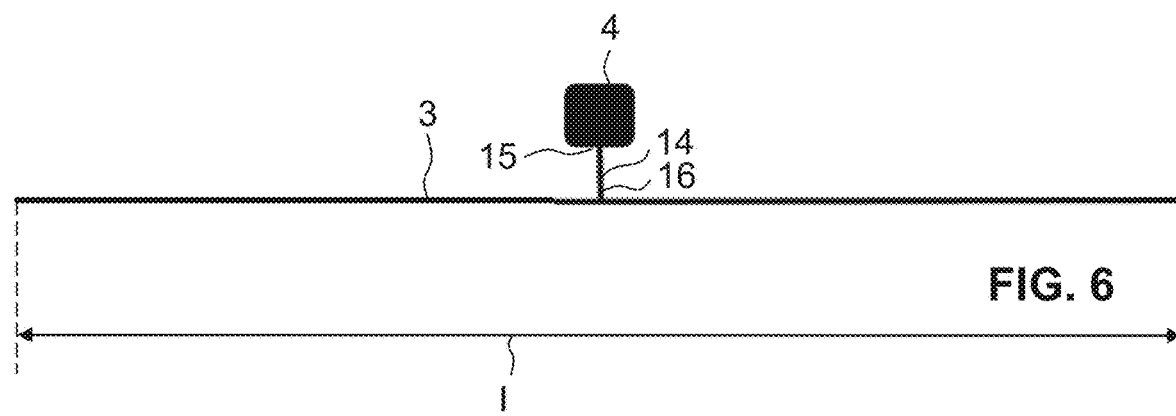
FIG. 6 shows a schematic representation of the security device comprising a connection device and an output device according to a second embodiment.

Another conceivable example comprising a wired connection between the connection device 3 and the output device 4 is depicted in FIG. 6. Here, said wired connection is established via an additional element, namely by a connection element in the form of an connection element 14 such as an electrically conductive wire, wherein one free end 15 of the connection element 14 is connected to the output device 4 and another free end 16 of the connection element 14 is connected to the connection device 3. Here, the connection between the connection element 14 and the connection device 3 is established in a middle region of the connection device 3. In other words, the connection element 14 divides the connection device 3 into two sections. In the event that the connection device 3 corresponds to an antenna as mentioned earlier, the connection device 3 of this design could be seen as a dipole antenna as well.

Figure 7:
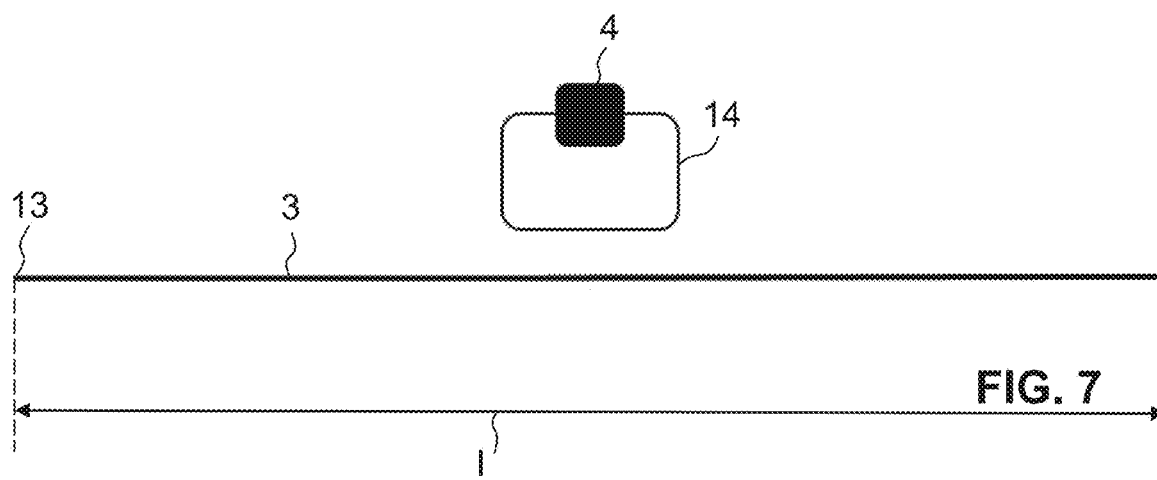
FIG. 7 shows a schematic representation of the security device comprising a connection device and an output device according to a third embodiment.

In the example depicted in FIG. 7, the connection device 3 is arranged separately from the output device 4, and wherein a connection element 14 such as a conductive wire is attached to the output device 4 only. Here, said connection element 14 has an essentially rectangular shape. An impedance of said connection element 14 and an impedance of the output device 4 form here an impedance matching circuit, and wherein a connection between the connection device 3 and the output device 4 is established via the impedance matching circuit and an impedance of the connection device 3. When the connection device 3 corresponds to an antenna as mentioned earlier, said connection device 3 can be configured as a monopole antenna or a dipole antenna as well, depending on the arrangement of the output device 4 with respect to the connection device 3. For instance, by arranging the output device 4 in a region of a free end of the connection device 3 a monopole antenna can be generated, whereas an arrangement of the output device 4 in a middle region of the connection device 3 as it is the case in FIG. 7 generates a dipole antenna. Thus, FIG. 7 depicts an example of a wireless connection being established by means of inductive coupling.

Figure 8:
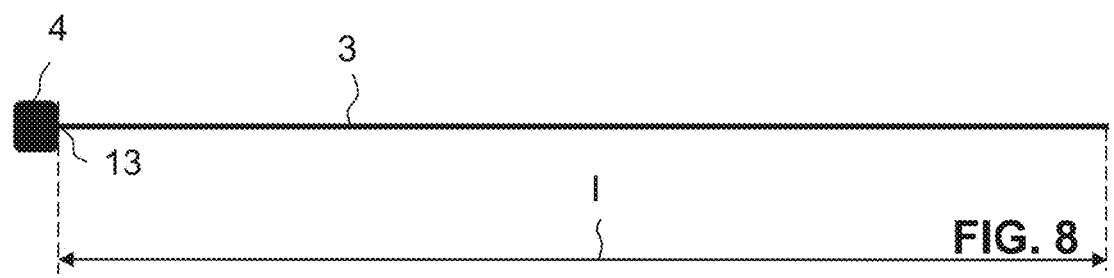
FIG. 8 shows a schematic representation of the security device comprising a connection device and an output device according to a fourth embodiment.

FIG. 8 depicts an example of a monopole antenna, wherein a free end 13 of the connection device 3 is attached to the output device 4. In other words, the connection device 3 extends away from the output device 4.

A total length l of the connection device 3 or, in the event of two or more connection devices 3, 3a, a total length l being the sum of the individual lengths l1, l2, . . . of the individual connection devices 3, 3a, is associated with a frequency of the connection device, and wherein said total length l preferably is equal to or a multiple of or a fraction of a wavelength being associated with the frequency of the output signal.

In fact, the output device 4 has a capacitance and the connection device 3 or connection devices 3, 3a have an inductance, and wherein the capacitance of the output device 4 and the inductance of the connection device(s) 3, 3a are configured to form a resonance circuit being associated with a frequency, and wherein a manipulation of the security device 1 and/or of the substrate 2 tunes the impedance of the output device 4 out of the frequency, whereby the output signal is changed or absent. In other words, the connection device 3 in the form of the antenna is associated with an inductance and the output device 4 in the form of the microchip is associated with a capacitance, which form here a resonance circuit tuned to a certain frequency or frequency range. Again in other words, the connection device 3, 3a, . . . in the form of the electrically conductive yarn or thread is acting like a coil which has inductance. By connecting the inductance and capacitance together as a parallel resonance circuit it has an electrical property, namely the impedance. Hence, the manipulation of the security device 1 and/or of the substrate 2 could manifest itself in a shifted frequency and thus in a RF change as mentioned above.

As just mentioned, the resonance circuit is preferably tuned to a certain frequency or frequency range and consequently to a certain target read range along which the output signal can be emitted. Said so-called target read range is application specific. The target read range for a passport preferably lies in the range of 40 millimeter to 100 millimeter, such that an output device 4 emitting output signals at a frequency in the range of 0.3 GHZ to 3 GHz and thus a connection device having a length of about 20 millimeter to 340 millimeter are preferred.

LIST OF REFERENCE SIGNS 1 security device
2 substrate
3, 3a, . . . connection device
4 output device
5, 5a, . . . carrier device
6 datapage
7, 7a, 7b, . . . security paper
8 cover
9 cover
10 hinge
11 spine tape
12 basic thread
13, 13a, . . . free end
14 connection element
15 free end
16 free end
L longitudinal direction
T transverse direction
l, l1, l2, . . . length

The invention claimed is:

1. A security device (1) for securing a substrate (2) against manipulation, the security device (1) comprising:
at least one connection device (3), and
at least one output device (4),
wherein the security device (1) is configured to be connected to the substrate (2) via the connection device (3),
wherein the output device (4) is configured to emit at least one output signal,
wherein the connection device (3) and the output device (4) are configured to be coupled to one another, wherein the security device (1) is configured such, that the output signal is outputted to an outside of the security device (1) when the connection device (3) and the output device (4) are coupled to one another, wherein a change in the coupling between the connection device (3) and the output device (4) results in a change in the output signal or in an absence of the output signal, wherein the change in the output signal or the absence of the output signal is indicative of a manipulation of the security device (1) and/or of the substrate (2), wherein the output device (4) has a capacitance and the connection device (3) has an inductance, and wherein the capacitance of the output device (4) and the inductance of the connection device (3) are configured to form a resonance circuit in a ultra high frequency range, and wherein the security device (1) is configured such that the manipulation of the security device (1) or the substrate (2) tunes an impedance of the output device (4) out of the frequency, whereby the output signal is changed or absent.

2. The security device (1) according to claim 1, wherein the output device (4) and the connection device (3) are configured such that the output signal is outputted from the output device (4) via the connection device (3) to the outside.

3. The security device (1) according to claim 1, wherein the connection device (3) is bendable and/or stretchable and/or elastically deformable or plastically deformable.

4. The security device (1) according to claim 1, wherein the connection device (3) is configured as a thread or yarn, and/or
wherein the connection device (3) is stitchable or sewable or weavable.

5. The security device (1) according to claim 1, wherein the connection device (3) is electrically conductive, and/or
wherein the connection device (3) comprises at least one metal and/or at least one metal-containing compound and/or at least one conductive polymer, the connection device (3) comprising at least one electrically conductive composite material.

6. The security device (1) according to claim 1, wherein the output device (4) is an electromagnetic device or an electronic device or a magnetic device and/or wherein the output signal is an electromagnetic field signal or an electric field signal or a magnetic field signal.

7. The security device (1) according to claim 1, further comprising a transponder, wherein the transponder comprises the output device (4) and the connection device (3), and
wherein the output device (4) is configured as a microchip, and/or
wherein the connection device (3) is configured as an antenna, and/or
wherein the transponder is a passive RFID transponder.

8. The security device (1) according to claim 1, wherein the output device (4) is configured to emit the output signal at a frequency in a range of 0.3 GHz to 3 GHZ, and/or
wherein the output signal is detectable by a detection device and/or is machine-readable, and/or
wherein the output device (4) comprises a non-volatile memory with data, wherein the output device (4) is configured to transmit the data to the outside via the output signal, and/or
wherein the output device (4) is configured to emit the output signal upon receipt of an input signal, the input signal emitted by the detection device and/or transmitted via the connection device (3).

9. The security device (1) according to claim 1, wherein the security device (1) is configured to emit the output signal within a predetermined distance and/or within a distance in a range of 10 millimeter to 10 meter, the predetermined distance and/or the distance in the range of 40 millimeter to 100 millimeter.

10. The security device (1) according to claim 1, wherein the coupling between the connection device (3) and the output device (4) is established via a wired connection or a wireless connection, and/or
wherein the security device (1) is further configured such that an impedance of the output device (4) and an impedance of the connection device (3) generate an impedance matching circuit, and wherein the coupling between the connection device (3) and the output device (4) is established via the impedance matching circuit.

11. The security device (1) according to claim 1, wherein the security device (1) comprises at least one carrier device (5),
wherein the output device (4) and/or the connection device (3) is arranged at least partially within the carrier device (5), and/or
wherein the carrier device (5) comprises one or more textiles and/or one or more fabrics and/or one or more paper-based compounds and/or one or more cardboard-based compounds and/or one or more plastics and/or one or more adhesive compounds.

12. The security device (1) according to claim 11, wherein the carrier device (5) is an adhesive device that is spine tape or bookbinding tape.

13. The security device (1) of claim 1 is comprised by a substrate (2), the substrate (2) is a security document or a value document.

14. A security device (1) for securing a substrate (2) against manipulation, the security device (1) comprising:
at least one connection device (3), and
at least one output device (4),
wherein the security device (1) is configured to be connected to the substrate (2) via the connection device (3),
wherein the output device (4) is configured to emit at least one output signal,
wherein the connection device (3) and the output device (4) are configured to be coupled to one another,
wherein the security device (1) is configured such, that the output signal is outputted to an outside of the security device (1) when the connection device (3) and the output device (4) are coupled to one another,
wherein a change in the coupling between the connection device (3) and the output device (4) results in a change in the output signal or in an absence of the output signal, and
wherein the change in the output signal or the absence of the output signal is indicative of a manipulation of the security device (1) and/or of the substrate (2),
wherein the change in the output signal is an RF change and/or a data change, and
wherein the RF change is at least one of:
a shifted frequency formed between the connection device (3) and the output device (4),
a reduced transmit power of the connection device (3) and/or the output device (4), a reduced receiver sensitivity of the connection device (3) and/or the output device (4), and a reduced antenna efficiency of the connection device (3) and/or the output device (4), wherein the data change is a data mismatch corresponding to data stored in a non-volatile memory of the output device (4) and further data stored in a further non-volatile memory of the security device (1) and/or of the substrate (2).

15. A security device (1) for securing a substrate (2) against manipulation, the security device (1) comprising:

at least one connection device (3), and at least one output device (4), wherein the security device (1) is configured to be connected to the substrate (2) via the connection device (3), wherein the output device (4) is configured to emit at least one output signal, wherein the connection device (3) and the output device (4) are configured to be coupled to one another, wherein the security device (1) is configured such, that the output signal is outputted to an outside of the security device (1) when the connection device (3) and the output device (4) are coupled to one another, wherein a change in the coupling between the connection device (3) and the output device (4) results in a change in the output signal or in an absence of the output signal, and wherein the change in the output signal or the absence of the output signal is indicative of a manipulation of the security device (1) and/or of the substrate (2), wherein the connection device (3) has a length corresponding to a frequency of the output signal, and wherein the length of the connection device (3) is equal to or a multiple of or a fraction of a wavelength corresponding to the frequency of the output signal.

16. A security device (1) for securing a substrate (2) against manipulation, the security device (1) comprising:

at least one connection device (3), and at least one output device (4), wherein the security device (1) is configured to be connected to the substrate (2) via the connection device (3), wherein the output device (4) is configured to emit at least one output signal, wherein the connection device (3) and the output device (4) are configured to be coupled to one another, wherein the security device (1) is configured such, that the output signal is outputted to an outside of the security device (1) when the connection device (3) and the output device (4) are coupled to one another, wherein a change in the coupling between the connection device (3) and the output device (4) results in a change in the output signal or in an absence of the output signal, and wherein the change in the output signal or the absence of the output signal is indicative of a manipulation of the security device (1) and/or of the substrate (2), wherein the substrate (2) comprises a hinge (10) extending along a longitudinal direction L of the substrate (2), the connection device (3) extending along the hinge (10) as well as along the longitudinal direction L as well as at least partly along a transverse direction T running perpendicularly to the longitudinal direction L.

* * * * *